United States Patent
Klaghofer

(10) Patent No.: US 7,486,629 B2
(45) Date of Patent: Feb. 3, 2009

(54) SYSTEM FOR CONTROLLING CONFERENCE CIRCUIT IN PACKET-ORIENTED COMMUNICATION NETWORK

(75) Inventor: Karl Klaghofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 847 days.

(21) Appl. No.: 10/637,703

(22) Filed: Aug. 11, 2003

(65) Prior Publication Data

US 2004/0071100 A1    Apr. 15, 2004

(30) Foreign Application Priority Data

Aug. 9, 2002   (DE) ................. 102 36 600

(51) Int. Cl.
*H04L 12/16*   (2006.01)
*H04Q 11/00*   (2006.01)
*H04M 3/42*   (2006.01)

(52) U.S. Cl. .................. 370/261; 370/271; 379/202.01

(58) Field of Classification Search ................ 370/259, 370/260, 261, 264, 271; 379/202.01, 203.01, 379/205.01; 348/14.08, 14.09
See application file for complete search history.

(56) References Cited

U.S. PATENT DOCUMENTS

| | | | |
|---|---|---|---|
| 5,963,547 A * | 10/1999 | O'Neil et al. ............... | 370/260 |
| 6,426,769 B1 | 7/2002 | Ludwig et al. | |
| 6,654,455 B1 * | 11/2003 | Isaka ..................... | 379/202.01 |
| 6,657,975 B1 * | 12/2003 | Baxley et al. ............... | 370/260 |
| 6,956,828 B2 * | 10/2005 | Simard et al. ............... | 370/260 |
| 2002/0089939 A1 | 7/2002 | Foti | |
| 2002/0107923 A1 * | 8/2002 | Chu et al. ................... | 709/205 |
| 2003/0108002 A1 * | 6/2003 | Chaney et al. .............. | 370/261 |

FOREIGN PATENT DOCUMENTS

EP    1 091 550    4/2001

* cited by examiner

*Primary Examiner*—Quoc D Tran
(74) *Attorney, Agent, or Firm*—Staas & Halsey LLP

(57) ABSTRACT

To control a conference circuit between multiple terminal devices in a packet-oriented communication network, circuit-oriented conference control signaling is transmitted via a packet-oriented transport protocol between a first terminal device and a communication server of the communication network. Setting up of packet-oriented media channels between the terminal devices and a packet-oriented conference mixing device is initiated by the communication server depending on the conference control signaling.

13 Claims, 3 Drawing Sheets

SYSTEM FOR CONTROLLING CONFERENCE CIRCUIT IN PACKET-ORIENTED COMMUNICATION NETWORK

CROSS REFERENCE TO RELATED APPLICATIONS

This application is based on and hereby claims priority to German Application No. 10236600.4 filed on Aug. 9, 2002, the contents of which are hereby incorporated by reference.

BACKGROUND OF THE INVENTION

In addition to supporting point-to-point connections, contemporary communication systems generally also support conference circuits, i.e., connections between three or more subscribers. Conference circuits can be set up, for example, between terminal devices for voice, video, or multimedia communication or between personal computers.

As part of a development currently taking place, communication connections and in particular real-time connections are increasingly also being carried over packet-oriented communication networks like, for example, local area networks or wide area networks such as, e.g., the Internet. Internet telephony, which is frequently also referred to as Voice/Video over Internet Protocol (VoIP) telephony is based on this technology, for example.

In the migration of circuit-oriented communication systems to packet-oriented communication systems such as, e.g., VoIP systems, manufacturers of circuit-oriented switching equipment, private branch exchange (PBX) equipment as it is known, have a major interest in continuing to use existing circuit-oriented conference equipment and conference software. Consequently, traditional circuit-oriented switching equipment, supplemented with packet-oriented interfaces and packet-oriented transport protocols, is frequently used in packet-oriented communication networks. This type of upgraded switching equipment is frequently also referred to as IP-PBX.

Previously, when circuit-oriented conference equipment was used in packet-oriented communication networks, the user-data packets were mainly processed by traditional, circuit-oriented processing resources such as, e.g., a Time Division Multiplex (TDM) switching unit or a conference bridge, in order in this way to mix different user-data streams, for example.

However, this type of user-data processing frequently necessitates multiple transitions between packet switching (VoIP) and circuit switching (TDM), as a result of which voice quality, for example, is substantially impaired. Furthermore, there is in this case a heavy dependency on existing circuit-oriented conference hardware, rendering migration to a native Internet Protocol-based system very difficult.

SUMMARY OF THE INVENTION

An object of the present invention is to provide a method and system for controlling a conference circuit in a packet-oriented communication network, whereby the disadvantages indicated above can be avoided.

According to the invention, to control a conference circuit between multiple terminal devices in a packet-oriented communication network, circuit-oriented conference control signaling is transmitted in the communication network via a packet-oriented transport protocol, e.g., the Internet Protocol, between a first terminal device and a communication server according to the invention. A switching device upgraded with packet-oriented interfaces and protocols, i.e., an IP-PBX, can be used as a communication server, for example. The communication server has a circuit-oriented conference module for processing the circuit-oriented conference control signaling. According to the invention, the communication server initiates, depending on the conference control signaling, the setting up of packet-oriented media channels such as, e.g., audio, video, or multimedia channels between the terminal devices and a packet-oriented conference mixing device. A multipoint control unit (MCU), for example, can be used as a conference mixing device. A conference mixing device of this kind serves the function of mixing media streams from different conference parties and of distributing the mixed media streams to these conference parties.

A key advantage of the invention is that existing circuit-oriented conference control equipment, or circuit-oriented conference control software can continue to be used both by the communication server and by the terminal devices. In particular, existing circuit-oriented conference control protocols can continue to be used between the terminal devices and the communication server. This considerably simplifies gradual migration toward packet-oriented systems. This in turn reduces any development costs required in each case.

Furthermore, the integration of the packet-oriented conference mixing device avoids transitions between circuit-oriented and packet-oriented media transmission, which has a positive effect on voice and video quality in conference circuits. In addition, the integration of the conference mixing device reduces dependency on the conference hardware of existing switching equipment. This in turn simplifies migration to native packet-oriented communication systems.

According to one advantageous embodiment of the invention, for existing first signaling channels between the communication server and the terminal devices a packet-oriented, second signaling channel can in each case be set up by the communication server between the communication server and the conference mixing device and assigned to the respective first signaling channel. The assignment can be managed by an assignment table provided in the communication server. First and second signaling channels assigned to one another can be connected to one another in such a way that respective signaling between a respective terminal device and the conference mixing device is forwarded transparently by the communication server or possibly, depending on the conference control signaling or a conference status, converted.

Furthermore, a respective first and/or second signaling channel can be assigned by the communication server to conference control signaling between the communication server and the first terminal device.

According to a further advantageous embodiment of the invention, the media channels can be set up, at least partially, in parallel. In this way, the time required to set up the conference circuit can be substantially reduced.

Furthermore, the communication server can, in the course of setting up the media channels in each case, transmit to the terminal devices a first signaling message, which initiates the closure of open media channels, and a second signaling message which initiates the opening of a media channel to the conference mixing device. The first and/or second signaling messages can preferably be transmitted via a respective first signaling channel. The first and/or second signaling messages are generally transmitted depending on messages from the conference mixing device and on conference control signaling. A message indicating communication capabilities of a respective communication partner can preferably be transmitted as a first and/or second signaling message. This type of message is frequently also referred to as a terminal-capability-set message. The closing of open media channels can be initiated here by a message with an empty capability set as a first signaling message and the opening of a media channel by a message with a non-empty capability set as a second signaling message.

Furthermore, the communication server can, in the course of setting up the media channels, transmit to the conference mixing device at least one channel set-up message with information about the terminal devices which are to participate in the conference circuit. The transmission can preferably take place via a respective second signaling channel. A connection establishment or setup message, for example, can be transmitted as a channel setup message.

According to an advantageous further development of the invention the communication server and the conference mixing device can be dynamically assigned to one another depending on their operating load. In this way, a conference mixing device can make available its processing resources to multiple, or changing communication servers. Avoiding a permanent assignment between conference server and conference mixing device can reduce the probability of overload situations or of blockage situations.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
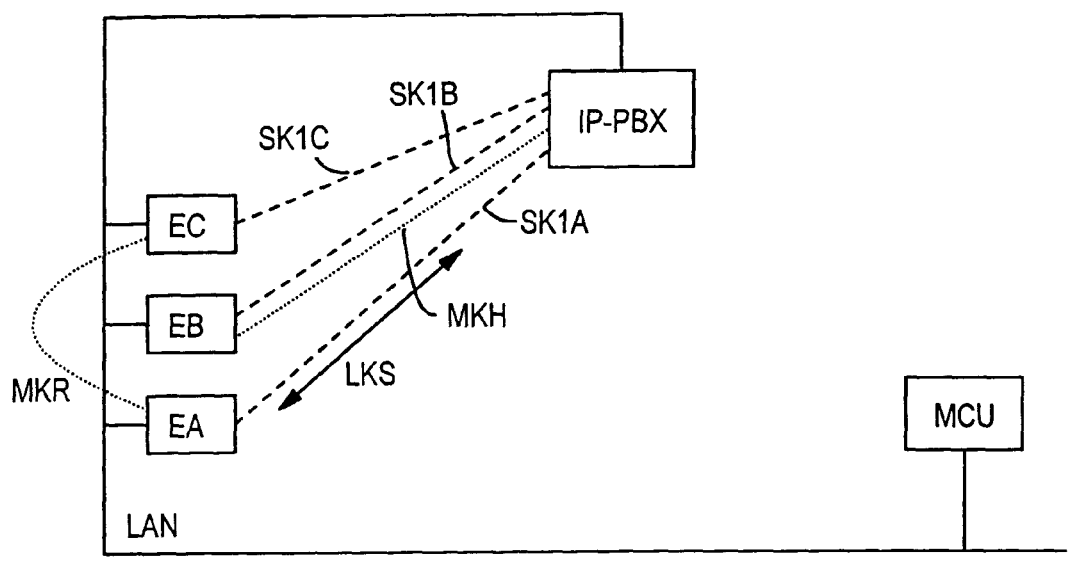
FIG. 1 is a block diagram of a communication system with multiple communication devices, linked via a packet-oriented communication network, before the introduction of a conference circuit.

Reference will now be made in detail to the preferred embodiments of the present invention, examples of which are illustrated in the accompanying drawings, wherein like reference numerals refer to like elements throughout.

Figure 2:
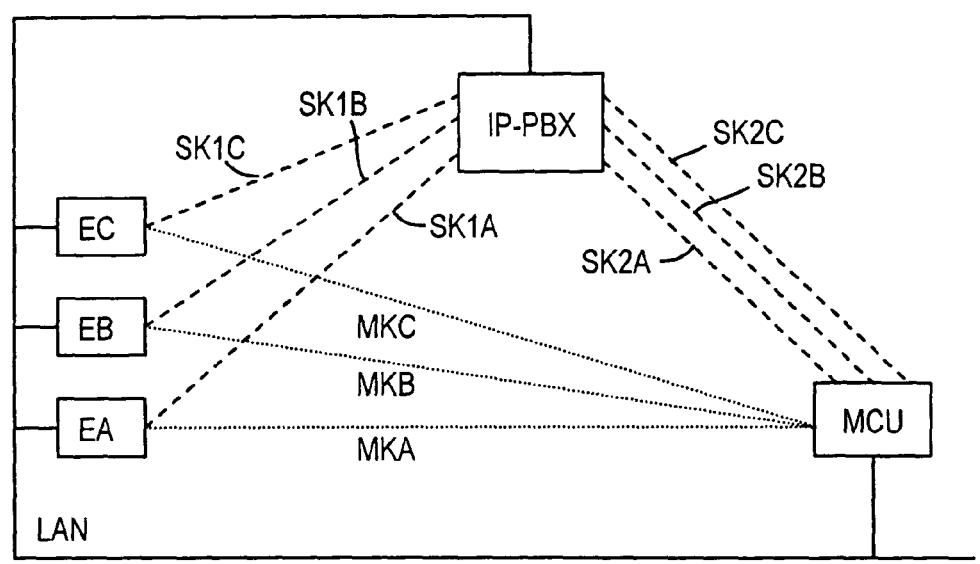
FIG. 2 is a block diagram of the communication system after the introduction of a conference circuit.

The following embodiment illustrates the use of the invention to set up a tripartite conference. FIGS. 1 and 2 each show a diagrammatic representation of a communication system with a packet-oriented communication network LAN, to which terminal devices EA, EB and EC, a communication server IP-PBX and a separate packet-oriented conference unit MCU are connected. The communication system is fashioned in the present embodiment as a Voice/Video over Internet Protocol (VoIP) system, preferably in conformance with ITU-T recommendation H.323. The communication network LAN is Internet Protocol-based and can be implemented, for example, by a local area network or by a wide area network, such as, for example, the Internet.

Terminal devices for real-time voice, video, or multimedia communication can be used as terminal devices EA, EB and EC. In the terminal devices EA, EB and EC, a circuit-oriented conference control protocol is implemented by a circuit-oriented conference module and a packet-oriented transport protocol, here the Internet Protocol. Hardware or software components of traditional circuit-oriented terminal devices can preferably be reused to implement the circuit-oriented conference control protocol and module.

The communication server IP-PBX is implemented in the present embodiment by a switching device (an IP-PBX) upgraded with packet-oriented transmission and control components. In the communication server IP-PBX, a circuit-oriented conference control protocol is implemented by a circuit-oriented conference module. As with the terminal devices EA, EB and EC, the circuit-oriented conference module in the communication server IP-PBX can preferably be implemented by corresponding hardware or software components of traditional circuit-oriented switching equipment.

A multipoint control unit (MCU), preferably a standard MCU as per ITU-T Recommendation H.323, is used as a conference unit MCU. As such, the conference unit MCU can be divided logically into a multipoint controller (MC) and a multipoint processor (MP). The conference unit MCU serves in the present embodiment as an external conference mixing device, i.e., it mixes packet-based media streams, e.g., voice, video, or multimedia data packet streams, from different conference participants and distributes the mixed media streams to the conference participants so that each conference participant receives the media streams outgoing from the other conference participants.

First signaling channels SK1A, SK1B and SK1C, which are indicated in FIGS. 1 and 2 by broken lines, are set up between the terminal devices EA, EB and EC and the communication server IP-PBX. In place of a single signaling channel, a signaling channel group including multiple, preferably Transmission Control Protocol-based (TCP-based), signaling channels can also be set up between the communication server IP-PBX and a terminal device EA, EB or EC. In accordance with this, the term first signaling channel SK1A, SK1B or SK1C should also be understood below as referring to such a group of individual signaling channels.

FIG. 1 shows the communication system before the introduction of a conference circuit by the terminal device EA. The communication system is in a consultation hold status in which the terminal device EB has been placed on hold by the terminal device EA and the terminal device EA has gone into consultation in relation to terminal device EC. Accordingly, a media channel MKH has been set up between the terminal device EB and the communication server IP-PBX via which media channel the terminal device EB receives, for example holding music, e.g., from a holding-music resource in the communication server IP-PBX, while holding. In addition, a media channel MKR, e.g., a voice, video, or multimedia channel, which runs directly over the LAN communication network, is set up between the terminal devices EA and EC for consultations. Consequently, an active link exists between the terminal devices EA and EC, whereby the call signaling proceeds via the first signaling channels SK1A and SK1C and the communication server IP-PBX, and the media streams, i.e., the user-data streams, are transmitted directly between the EA and EC. The media channels MKH and MKR are each indicated in FIG. 1 by dotted lines.

The setting up of the conference circuit is initiated and controlled by circuit-oriented conference control signaling LKS, which is transmitted over the first signaling channel SK1A (or via a specific signaling channel of the corresponding signaling channel group) between the terminal device EA and the communication server IP-PBX. The conference control signaling LKS is based on the circuit-oriented conference control protocol implemented in the terminal device EA and the communication server IP-PBX. Existing hardware and software components of traditional circuit-oriented conference modules can preferably be used to perform the conference control signaling LKS.

FIG. 2 shows the communication system after the introduction of the conference circuit by the terminal device EA. At the instigation of the communication server IP-PBX, the conference unit MCU is dynamically (ad hoc) integrated into the conference circuit. In this process, Internet Protocol-based, second signaling channels SK2A, SK2B and SK2C, preferably in conformance with ITU-T recommendation H.225.0, are set up between the communication server IP-PBX and the conference unit MCU and in each case assigned to one of the first signaling channels SK1A, SK1B or SK1C (or an appropriate signaling channel group). In the present embodiment, the signaling channel SK2A is assigned to the signaling channel SK1A, the signaling channel SK2B to the signaling channel SK1B and the signaling channel SK2C to the signaling channel SK1C. The signaling channels SK2A, SK2B and SK2C are based on a packet-oriented control protocol, e.g., conforming to ITU-T recommendation H.225.0.

Signaling relating to the conference circuit is transmitted via the signaling channels assigned to one another, SK1A and SK2A, SK1B and SK2B and SK1C and SK2C, between the terminal devices EA, EB and EC and the conference unit MCU through switching by the communication server IP-PBX. This signaling is either forwarded transparently or converted appropriately by the communication server IP-PBX.

Furthermore, packet-oriented media channels MKA, MKB and MKC, e.g., voice, video, or multimedia channels, are set up as user-data channels which link the conference unit MCU over the communication network LAN directly with the terminal devices EA, EB and EC. The media streams to be transmitted in the context of the conference circuit are transmitted via the media channels MKA, MKB and MKC directly between the conference unit MCU and the terminal devices EA, EB and EC.

The conference unit MCU and the terminal devices EA, EB and EC are each prompted by the communication server IP-PBX, depending on the conference control signaling LKS, to set up the signaling channels SK2A, SK2B and SK2C and the media channels MKA, MKB and MKC.

Figure 3:
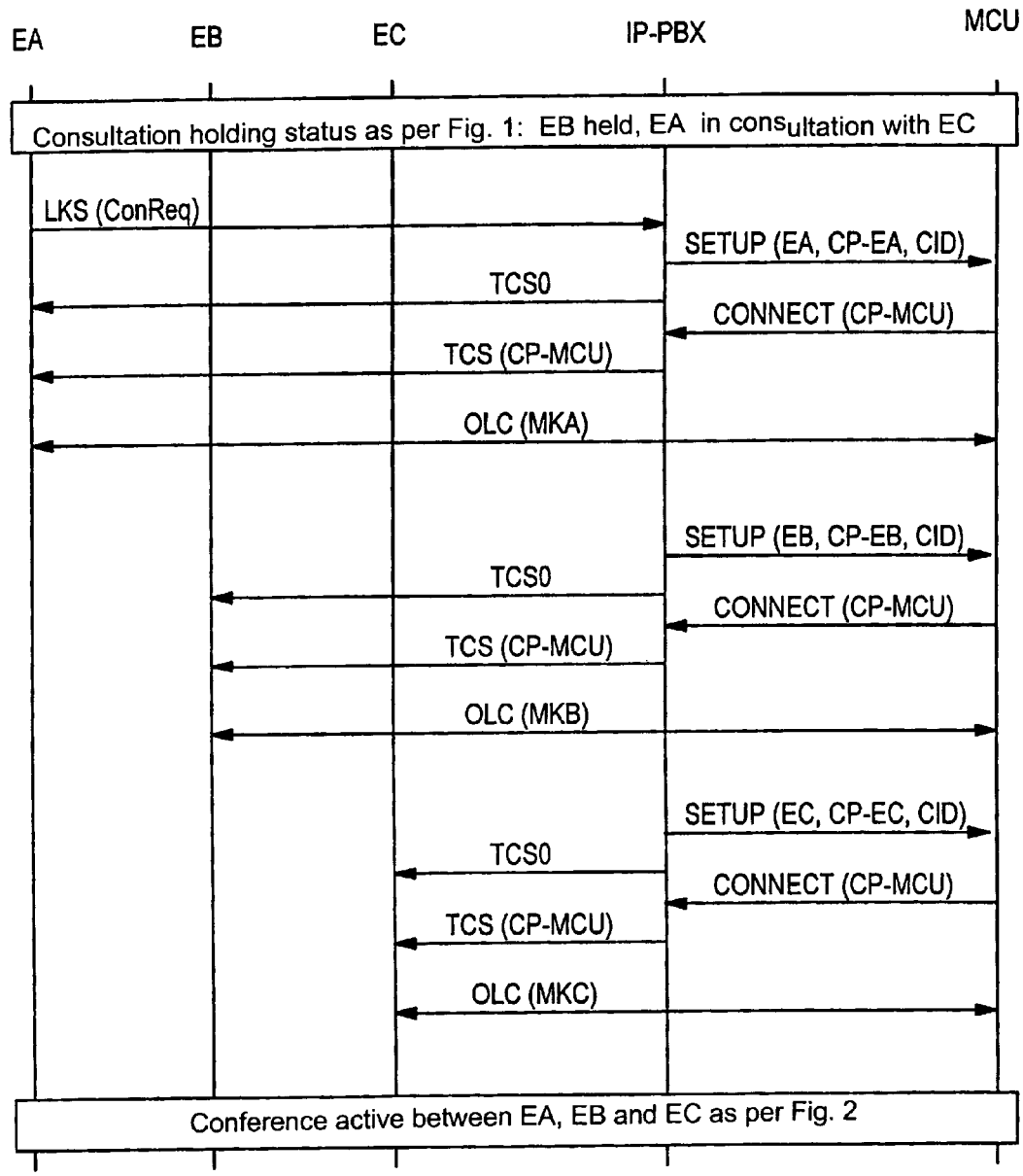
FIG. 3 is a timing diagram of the signaling sequence in the setting up of a conference circuit.

FIG. 3 shows a flowchart to illustrate the signaling sequence when the conference circuit is set up. At the beginning of the signaling sequence, the communication system is in the consultation hold status illustrated by FIG. 1.

The conference circuit is prompted by the terminal device EA through transmission of a conference initiation message ConReq, e.g., a conference-request message, to the communication server IP-PBX. The conference initiation message ConReq is transmitted within the framework of the circuit-oriented conference control signaling LKS via the signaling channel SK1A (or via a specific signaling channel of the appropriate signaling channel group). Alternatively, a stimulus message, e.g., a key address, can be transmitted in place of the conference initiation message ConReq, depending on the conference control protocol used between the terminal device EA and the conference server IP-PBX.

The conference initiation message ConReq, is used to identify its originator, here the terminal device EA, by the communication server IP-PBX. The arrival of the conference initiation message ConReq prompts the communication server IP-PBX to transmit a setup message SETUP as a message to set up a channel, preferably in conformance with ITU-T recommendation H.225.0, to the conference unit MCU. The setup of the signaling channel SK2A is prompted by the setup message SETUP. The signaling channel to be set up SK2A is assigned here to the signaling channel SK1A by the communication server IP-PBX.

The setup message SETUP contains information identifying the terminal device EA, a conference code CID and capability information CP-EA which indicates the specific communication capabilities of the terminal device EA. The setup message SETUP thus contains information elements which refer not to the communication server IP-PBX itself but to the terminal device EA for which the communication server IP-PBX is setting up the signaling channel SK2A. The setup message SETUP is acknowledged by the conference unit MCU by a connect message CONNECT, preferably conforming to ITU-T recommendation H.225.0. The connect message CONNECT contains capability information CP-MCU which indicates the specific communication capabilities of the conference unit MCU.

The conference initiation message ConReq also prompts the communication server IP-PBX to reconfigure the media streams, i.e., to close the media channels MKR and MKH and to set up the new direct media channels MKA, MKB and MKC between the terminal devices EA, EB and EC and the conference unit MCU. To this end, a terminal-capability-set message TCS0 with an empty capability set is transmitted by the communication server IP-PBX, preferably in conformance with ITU-T recommendation H.245, as a first signaling message to the terminal device EA. The terminal-capability-set message TCS0 prompts the receiving terminal device, in this case EA, indirectly to close all its user-data send channels, in this case the media channel MKR. After receiving the connect message CONNECT, the communication server IP-PBX also transmits a terminal-capability-set message TCS with a non-empty capability set as a second signaling message, preferably in conformance with the H.245 recommendation, to the terminal device EA. The capability information CP-MCU is transmitted with the terminal-capability-set message TCS to the terminal device EA. The terminal-capability-set message TCS prompts the receiving terminal device, in this case EA, indirectly to open one or more new user-data send channels to the conference unit MCU. The terminal-capability-set messages TCS0 and TCS are transmitted via the signaling channel SK1A (or via a specific signaling channel of the corresponding signaling channel group). Such closing and opening of user-data send channels by terminal-capability-set messages is frequently also termed a pause-and-rerouting procedure, in the present application case a third-party-pause-and-rerouting procedure.

After the interchange of the respective capability information CP-EA and CP-MCU between the terminal device EA and the conference unit MCU, the media channel MKA between these is set up through transmission of a channel-opening message Open Logical Channel (OLC), preferably in conformance with the H.245 recommendation. The channel-opening message OLC is transmitted via the signaling channels SK1A (or via a specific signaling channel of the corresponding signaling channel group) and SK2A.

The above procedure is analogously also performed for the terminal devices EB and EC sequentially or in parallel, i.e., the signaling channels SK2B and SK2C are set up by corresponding setup and connect messages and the media channels MKB and MKC are set up by corresponding terminal-capability-set messages TCS0, TCS and channel-opening messages OLC. Finally, a point-to-point communication link exists between the conference unit MCU and each of the terminal devices EA, EB and EC, the signaling being directed in each case via the communication server IP-PBX.

As an alternative to transmitting a separate setup message in each case for each terminal device EA, EB and EC to be included in the conference circuit, the conference server IP-PBX can transmit the information required about all the terminal devices EA, EB, and EC to be included in a single setup message to the conference unit MCU.

The media streams to be transmitted within the framework of the conference circuit are transmitted via the media channels MKA, MKB and MKC set up directly between the conference unit MCU and each individual terminal device EA, EB and EC. Using the conference code CID transmitted in the setup messages SETUP, the conference unit MCU can recognize the received setup messages SETUP as belonging to the same conference circuit and accordingly mix the incoming media streams and send back the mixed media streams to the terminal devices participating in the conference circuit. The conference circuit is consequently active.

Figure 4:
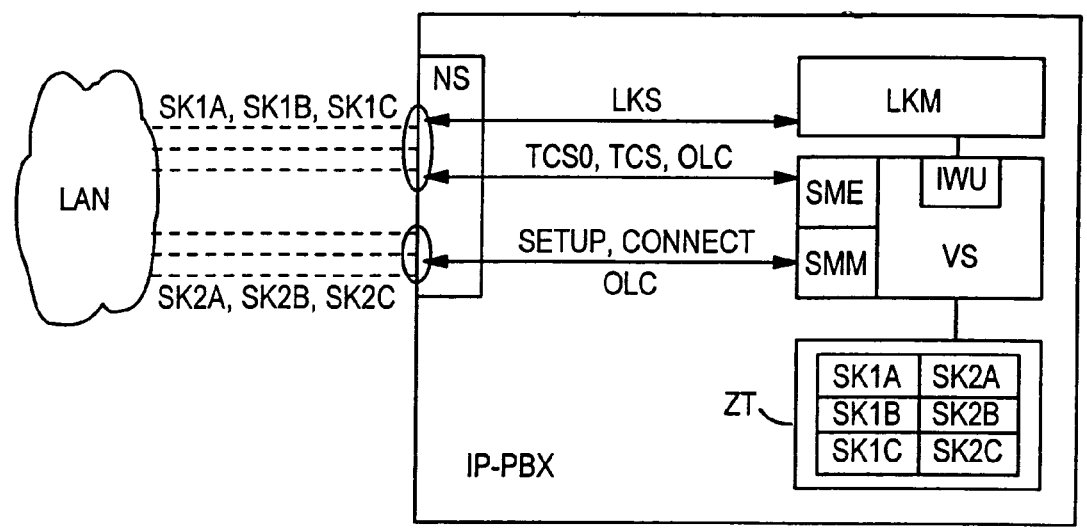
FIG. 4 is a block diagram of a communication server according to the invention.

FIG. 4 shows a detailed representation of the conference server IP-PBX according to the invention. The conference server IP-PBX has a preferably Internet Protocol-based network interface NS for connecting to the communication network LAN.

The signaling channels SK1A, SK1B, SK1C, SK2A, SK2B and SK2C leading according to the present embodiment into the communication network LAN are indicated by broken lines. As additional functional components, the conference server IP-PBX has a circuit-oriented conference module LKM, a switching control VS and an assignment table ZT.

The circuit-oriented conference module LKM serves to process and control the circuit-oriented conference control signaling LKS. The conference module LKM can be implemented by hardware or software components, e.g., in the form of program objects as defined by an object-oriented programming model. Existing hardware or software components of traditional circuit-oriented conference devices can preferably be reused. The conference module LKM exchanges the conference control signaling LKS with the terminal device EA via the network interface NS and the signaling channel SK1A.

The switching control VS is generally used for switching connections in the communication system and in particular for reconfiguring media streams in the process of setting up the conference circuit. In the present embodiment, the switching control VS prompts the terminal devices EA, EB and EC and the conference unit MCU to set up the media channels MKA, MKB and MKC and the signaling channels SK2A, SK2B and SK2C. The switching control VS can preferably be implemented using standardized device functions.

The switching control VS has a conversion device IWU to which the conference module LKM is connected. The conversion device IWU serves to convert the circuit-oriented conference control signaling LKS into respective control messages for the terminal devices EA, EB and EC and for the conference unit MCU. The circuit-oriented conference control protocol is hereby converted into the respective control protocols for the terminal devices EA, EB and EC and for the conference unit MCU.

The switching control VS also has a control unit SME providing control means for controlling the terminal devices EA, EB and EC and a control unit SMM providing control means for controlling the conference unit MCU. The terminal-capability-set messages TCS0 and TCS and the channel-opening messages OLC are exchanged by the control unit SME via the network interface NS and the signaling channels SK1A, SK1B and SK1C with the terminal devices EA, EB and EC. Correspondingly, the setup messages SETUP, the connect messages CONNECT and the channel-opening messages OLC are exchanged by the control unit SMM via the network interface NS and the signaling channels SK2A, SK2B and SK2C with the conference unit MCU.

Also connected to the switching control VS is the assignment table ZT, in which the signaling channels SK1A, SK1B and SK1C are in each case assigned in pairs to the signaling channels SK2A, SK2B and SK2C.

Application of the invention is not restricted to the present embodiment. In particular, the number of terminal devices before the initiation of the conference is not fixed at three terminal devices. Thus, more than one terminal, or else no terminal at all, may be in hold status before the conference is initiated. After the conference has been initiated, further terminal devices can be integrated into the conference circuit, both through the original initiating terminal device and through other terminal devices. In this respect, in addition to ad-hoc conferences, e.g., arising out of a consultation hold status, other conference variants such as, e.g., meet-me conferences can be implemented.

Furthermore, the terminal devices participating in the conference circuit can also connected to different communication servers. The conference unit MCU can also provide its mixing function for multiple communication servers, i.e., no 1:1 assignment is required between communication server and conference unit.

The invention can also be used both for corporate VoIP systems and for VoIP-carrier systems.

In place of VoIP terminal devices, Time Division Multiplex (TDM) endpoints can be integrated into a conference circuit. In this case, terminal-device functions relevant to the invention are executed by a gateway device.

Also, to increase the performance capability, multiple conference units can be placed in a cascaded arrangement.

In addition, the invention can be used in a communication environment conforming to the IETF standard Session Initiation Protocol (SIP) instead of in an H.323 communication environment. In this case, a conference unit conforming to the SIP standard must be used.

Finally, the method according to the invention can, through appropriate variants in the reconfiguring of media channels, be used for controlling other performance features such as, e.g., intrusion or silent monitoring as well as for controlling conference circuits.

The invention has been described in detail with particular reference to preferred embodiments thereof and examples, but it will be understood that variations and modifications can be effected within the spirit and scope of the invention.

The invention claimed is:

1. A method for controlling a conference circuit between terminal devices in a packet-oriented communication network, comprising:
    transmitting circuit-oriented conference control signaling via a packet-oriented transport protocol between a first terminal device and a communication server of the packet-oriented communication network; and
    initiating setup of packet-oriented media channels directly between the terminal devices and a packet-oriented conference mixing device by the communication server depending on the conference control signaling, the packet-oriented conference mixing device mixing conference media streams transmitted via the packet-oriented media channels, wherein
    each of the terminal devices implements both a circuit-switched conference control protocol and a packet-oriented transport protocol.

2. A method according to claim 1, further comprising setting up and assigning a packet-oriented additional signaling channel by the communication server between the communication server and the packet-oriented conference mixing device for each existing signaling channel between the communication server and the terminal devices.

3. A method according to claim 2, wherein a combination of the existing and additional signaling channels is assigned by the communication server to conference control signaling between the communication server and the first terminal device.

4. A method according to claim 3, further comprising setting up the packet-oriented media channels are, at least partially, in parallel.

5. A method according to claim 4, further comprising:
transmitting a first signaling message from the communication server to each of the terminal devices, within the framework of setting up the media channels, to initiate closing of open media channels, and
transmitting a second signaling message to initiate opening of at least one of the media channel to the conference mixing device.

6. A method according to claim 5, further comprising transmitting from the communication server to the conference mixing device, within the framework of setting up the media channels, at least one channel-setup message with information about the terminal devices to participate in the conference circuit.

7. A method according to claim 6, further comprising dynamically assigning the communication server and the conference mixing device to one another depending on operating load.

8. A communication server for controlling a conference circuit between terminal devices, including a first terminal device, in a packet-oriented communication network having a network interface and a packet-oriented conference mixing device, based on a packet-oriented transport protocol for connecting to the packet-oriented communication network, said communication server comprising:
a circuit-oriented conference module, coupled to the packet-oriented communication network, to process circuit-oriented conference control signaling to be transmitted via the transport protocol between said communication server and the first terminal device, and
a switching control unit to initiate setup of packet-oriented media channels directly between the terminal devices and the packet-oriented conference mixing device of the packet-oriented communication network depending on the conference control signaling, the packet-oriented conference mixing device mixing conference media streams transmitted via the packet-oriented media channels, wherein
each of the terminal devices implements both a circuit-switched conference control protocol and a packet-oriented transport protocol.

9. A communication server according to claim 8, further comprising an assignment table to assign to each existing signaling channels between the communication server and the terminal devices a packet-oriented additional signaling channel to be set up between the communication server and the packet-oriented conference mixing device.

10. A communication server according to claim 9, further comprising first control means for controlling the packet-oriented conference mixing device depending on the conference control signaling.

11. A communication server according to claim 10, further comprising second control means for controlling the terminal devices depending on the conference control signaling.

12. A communication server according to claim 11, further comprising a conversion device to convert the conference control signaling into control messages for the terminal devices and the packet-oriented conference mixing device.

13. A method according to claim 1, wherein the communication server prompts each terminal device and the packet-oriented conference mixing device to set up signaling channels with the communication server, the communication server further prompting the packet-oriented mixing device to setup media channels between the packet-oriented mixing device and each terminal device.

* * * * *